US008547372B2

(12) United States Patent
Chung et al.

(10) Patent No.: US 8,547,372 B2

(45) Date of Patent: Oct. 1, 2013

(54) PIXEL CIRCUIT AND ORGANIC LIGHT EMITTING DIODE DISPLAY DEVICE USING THE SAME

(75) Inventors: Bo-Yong Chung, Yongin (KR); Yong-Sung Park, Yongin (KR); Deok-Young Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 390 days.

(21) Appl. No.: 12/877,898

(22) Filed: Sep. 8, 2010

(65) Prior Publication Data

US 2011/0157126 A1 Jun. 30, 2011

(30) Foreign Application Priority Data

Dec. 31, 2009 (KR) ........................ 10-2009-0136214

(51) Int. Cl.

*G06F 3/038* (2013.01)
*G09G 5/00* (2006.01)
*G09G 3/30* (2006.01)

(52) U.S. Cl.

USPC ............................................. 345/212; 345/76

(58) Field of Classification Search

USPC .................... 345/76–83, 204–215, 690–699; 315/169.1–169.4

See application file for complete search history.

(56) References Cited

U.S. PATENT DOCUMENTS

2007/0001958 A1 1/2007 Lee et al.
2007/0103405 A1* 5/2007 Kwak et al. ..................... 345/76
2008/0224965 A1* 9/2008 Kim ................................ 345/76
2008/0291351 A1 11/2008 Han et al.
2010/0033409 A1* 2/2010 Park ............................... 345/76

FOREIGN PATENT DOCUMENTS

KP 10-2008-0103736 A 11/2008
KR 10-2007-0002155 A 1/2007
KR 10-2007-0019463 2/2007
KR 10-0795810 B1 1/2008
KR 10-2008-0080754 9/2008
KR 10-2008-0084017 9/2008
KR 10-2009-0003894 A 1/2009

OTHER PUBLICATIONS

Edgar Sanchez-SinencoLow Voltage Analog Circuit Design Techniques, IEEE Dallas CAS Workshop 2000, pp. 7, 19, 24.*

KIPO Registration Determination Certificate dated Nov. 14, 2011 for KR 10-2009-0136214 (5 pages).

* cited by examiner

*Primary Examiner* — Ariel Balaoing
*Assistant Examiner* — Larry Sternbane
(74) *Attorney, Agent, or Firm* — Christie, Parker & Hale, LLP

(57) ABSTRACT

A pixel circuit and an organic light emitting diode (OLED) display device using the same are provided. The pixel circuit compensates for a threshold voltage of a driver transistor and for a voltage drop, and separately drives an initialization time to improve a contrast ratio. The pixel circuit further suppresses a leakage current caused by a data voltage using a fixed power source so that current variation caused by the leakage current can be reduced or minimized to improve crosstalk, and the duty of an emission control signal can be adjusted to remove motion blur. The pixel circuit also compensates for a leakage current generated in a turn-off state of a transistor with an increase in a drain-source voltage.

17 Claims, 10 Drawing Sheets

PIXEL CIRCUIT AND ORGANIC LIGHT EMITTING DIODE DISPLAY DEVICE USING THE SAME

CROSS-REFERENCE TO RELATED APPLICATION

This application claims priority to and the benefit of Korean Patent Application No. 10-2009-0136214, filed on Dec. 31, 2009, in the Korean Intellectual Property Office, the disclosure of which is incorporated herein in its entirety by reference.

BACKGROUND

1. Field

Aspects of embodiments according to the present invention relate to a pixel circuit and an organic light emitting diode (OLED) display device.

2. Description of the Related Art

A display device may apply a data driving signal corresponding to input data to a plurality of pixel circuits to control the luminance of each of pixels so that the input data can be converted into an image and an image may be provided to a user. The data driving signal to be applied to the plurality of pixel circuits may be generated by a data driver. The data driver may select a gamma voltage corresponding to the input data from among a plurality of gamma voltages generated by a gamma filter circuit, and then output the selected gamma voltage as a data driving signal to the plurality of pixel circuits.

SUMMARY

Aspects of embodiments according to the present invention provide an organic light emitting diode (OLED) display device, which is configured to compensate for a threshold voltage and a voltage drop of a driver transistor.

Another aspect of the embodiments according to the present invention provides an OLED display device for improving a contrast ratio by separating an initialization time.

Additionally, another aspect of the embodiments of the present invention provides an OLED display device for reducing crosstalk by suppressing a leakage current caused by a data voltage using a fixed power source so that a current variation due to the leakage current can be reduced or minimized.

Another aspect of the embodiments of the present invention provides an OLED display device which may reduce or remove motion blurring by adjusting the duty of an emission control signal.

According to an embodiment of the present invention, there is provided a pixel circuit for driving a light emitting device comprising a first electrode and a second electrode, the pixel circuit comprising: a driver transistor comprising a first electrode, a second electrode, and a gate electrode, the driver transistor for supplying a driving current according to a voltage applied to the gate electrode of the driver transistor; a second transistor for receiving a second scan control signal, the second transistor comprising a first electrode coupled to the gate electrode of the driver transistor and a second electrode coupled to a first node; a third transistor for receiving the second scan control signal, the third transistor comprising a first electrode coupled to the first node and a second electrode coupled to the second electrode of the driver transistor; a fourth transistor comprising a second electrode, wherein a data signal is transferred to the second electrode in response to the second scan control signal; a fifth transistor for transmitting a first power supply voltage to the second electrode of the fourth transistor in response to a second emission control signal; a sixth transistor coupled in series between the second electrode of the driver transistor and the first electrode of the light emitting device, the sixth transistor for outputting the driving current received from the driver transistor to the first electrode of the light emitting device in response to a first emission control signal applied to a gate electrode of the sixth transistor; a seventh transistor for transmitting an initialization voltage to a second electrode of the seventh transistor in response to a first scan control signal; an eighth transistor for transmitting the initialization voltage to the gate electrode of the driver transistor in response to the first scan control signal; a ninth transistor for transmitting a reference voltage to the second electrode of the second transistor, to the first electrode of the third transistor, to the second electrode of the seventh transistor, and to a first electrode of the eighth transistor; and a first capacitor comprising a first electrode coupled to the second electrode of the fourth transistor and a second electrode of the fifth transistor, and a second electrode coupled to the gate electrode of the driver transistor.

The light emitting device may be an organic light emitting diode (OLED).

The second transistor and the third transistor may couple the gate electrode of the driver transistor to the first electrode of the driver transistor in response to the second scan control signal.

The second electrode of the light emitting device may be coupled to a third power supply.

The initialization voltage may be a third power supply voltage.

The reference voltage may be the first power supply voltage.

The pixel circuit can further include a second capacitor comprising a first electrode coupled to the second electrode of the first capacitor and a second electrode coupled to a second power supply voltage source.

The first electrode of the driver transistor may be a source electrode, and the second electrode of the driver transistor may be a drain electrode.

The first and second scan control signals and the first and second emission control signals may be driven during: a first time period in which the first scan control signal and the second emission control signal are at a first signal level, and the second scan control signal and the first emission control signal are at a second signal level; a second time period in which the data signal is ready for programming the pixel circuit, the first scan control signal, the first emission control signal, and the second emission control signal are at the second signal level, and the second scan control signal is at the first signal level; a third time period in which the first and second scan control signals and the second emission control signal are at the second signal level, and the first emission control signal is at the first signal level; and a fourth time period in which the first and second scan control signals are at the second signal level and the first and second emission control signals are at the first signal level, wherein the first signal level is a level at which the driver transistor and the second through ninth transistors are turned on, and the second signal level is a level at which the driver transistor and the second through ninth transistors are turned off.

According to another embodiment of the present invention, an organic light emitting diode (OLED) display device includes: a plurality of pixels; a scan driver configured to output first and second scan control signals and first and second emission control signals to each pixel of the plurality of pixels; and a data driver configured to generate a data signal and output the data signal to each pixel of the plurality of pixels, wherein each pixel of the plurality of pixels comprises: an organic light emitting diode comprising first and second electrodes; a driver transistor comprising a first electrode, a second electrode, and a gate electrode, the driver transistor for outputting a driving current in response to a voltage applied to the gate electrode of the driver transistor; a second transistor for receiving a second scan control signal, the second transistor comprising a first electrode coupled to the gate electrode of the driver transistor and a second electrode coupled to a first node; a third transistor for receiving the second scan control signal, the third transistor comprising a first electrode coupled to the first node and a second electrode coupled to the second electrode of the driver transistor; a fourth transistor comprising a second electrode, wherein a data signal is transferred to the second electrode in response to the second scan control signal; a fifth transistor for transmitting a first power supply voltage to the second electrode of the fourth transistor in response to the second emission control signal; a sixth transistor coupled in series between the second electrode of the driver transistor and the first electrode of the light emitting device, the sixth transistor for outputting the driving current output by the driver transistor to the first electrode of the light emitting device in response to the first emission control signal applied to a gate electrode of the sixth transistor; a seventh transistor for transmitting an initialization voltage to a second electrode in response to the first scan control signal; an eighth transistor for transmitting the initialization voltage to the gate electrode of the driver transistor in response to the first scan control signal; a ninth transistor for transmitting a reference voltage to the second electrode of the second transistor and the first electrode of the third transistor in response to the first emission control signal, and for transmitting the reference voltage to the second electrode of the seventh transistor and a first electrode of the eighth transistor; and a first capacitor comprising a first electrode coupled to the second electrode of the fourth transistor and to the second electrode of the fifth transistor and a second electrode coupled to the gate electrode of the driver transistor.

The second transistor and the third transistor may couple the gate electrode of the driver transistor to the first electrode of the driver transistor in response to the second scan control signal.

The second electrode of the light emitting device is coupled to a third power supply.

The initialization voltage may be a third power supply voltage.

The reference voltage may be the first power supply voltage.

The OLED display device may further include a second capacitor comprising a first electrode coupled to a second electrode of the first capacitor and a second electrode coupled to a second power supply voltage source.

The first electrode of the driver transistor may be a source electrode, and the second electrode of the driver transistor may be a drain electrode.

The scan driver may be driven during: a first time period in which the first scan control signal and the second emission control signal are at a first signal level and the second scan control signal and the first emission control signal are at a second signal level; a second time period in which the data signal is ready for programming a pixel of the pixels, the first scan control signal, the first emission control signal, and the second emission control signal are at the second signal level, and the second scan control signal is at the first signal level; a third time period in which the first and second scan control signals and the second emission control signal are at the second signal level, and the first emission control signal is at the first signal level; and a fourth time period in which the first and second scan control signals are at the second signal level and the first and second emission control signals are at the first signal level, wherein the first signal level is a level at which the driver transistor and the second through ninth transistors are turned on, and the second signal level is a level at which the driver transistor and the second through ninth transistors are turned off.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

Figure 1:
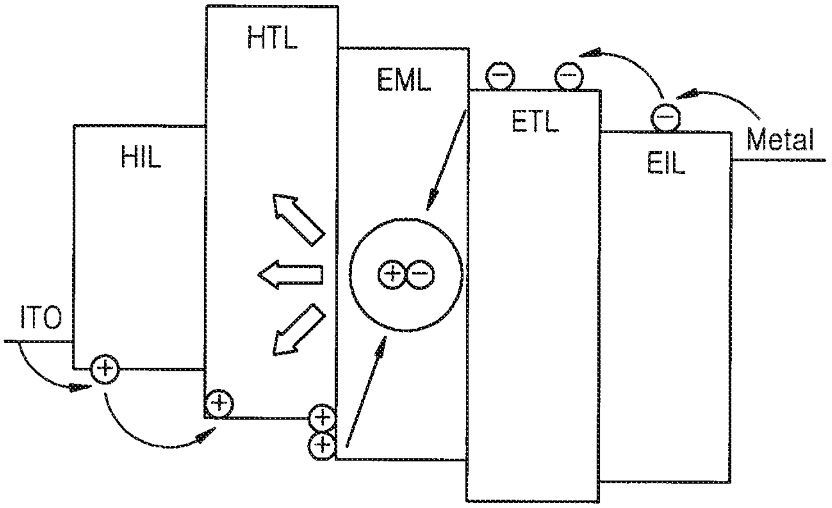
FIG. 1 is a diagram illustrating the emission principle of an organic light emitting diode (OLED)

Exemplary embodiments of the present invention will now be described more fully with references to the accompanying drawings. Like reference numerals in the drawings denote like elements, and thus redundant descriptions will be omitted for conciseness. Additionally, descriptions of well-known components and processing techniques are omitted so as not to unnecessarily obscure the embodiments of the present invention. The present invention described herein, should not be construed as limited to the embodiments set forth herein. Rather, these embodiments are provided so that this disclosure will be thorough and complete, and will fully convey the scope to those skilled in the art.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIG. 1 is a diagram illustrating the emission principle of an organic light emitting diode (OLED).

An OLED display device may electrically excite a fluorescent organic compound to emit light. Organic light emitting devices (e.g., OLEDs) arranged in a matrix format may be driven using a voltage or a current to display an image. Since the organic light emitting devices may have diode characteristics, they may be called OLEDs.

An OLED may include an indium tin oxide (ITO) anode, an organic thin layer, and a metal cathode that are stacked sequentially. The organic thin layer may include an emission layer (EML), an electron transport layer (ETL), and a hole transport layer (HTL) so that the balance of electrons and holes can be improved to increase luminance efficiency. In addition, the organic thin layer may further include a hole injection layer (HIL) or an electron injection layer (EIL).

Figure 2:
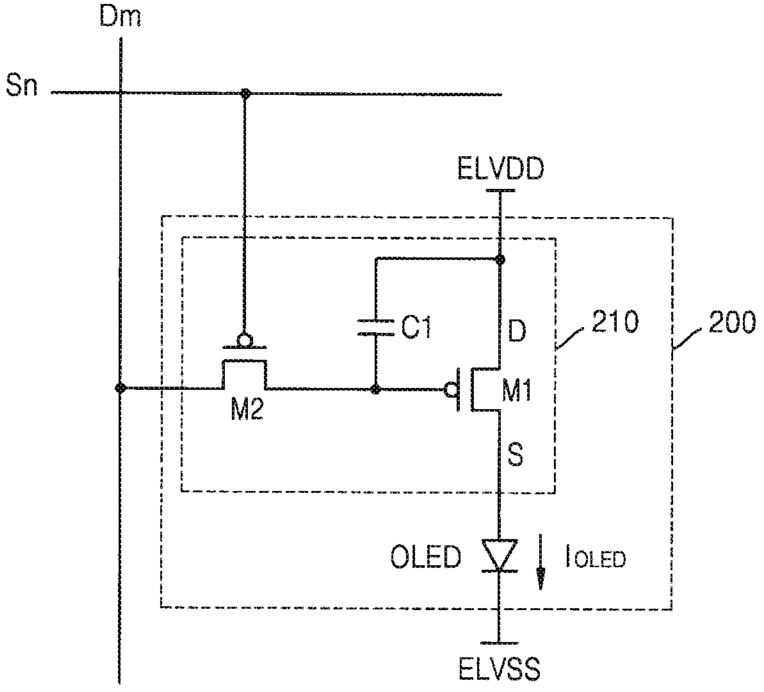
FIG. 2 is a circuit diagram of a pixel circuit of an organic light emitting display.

FIG. 2 is a circuit diagram of a pixel circuit of an organic light emitting display.

An OLED display device may include a plurality of pixels 200, each including an OLED and a pixel circuit 210. The OLED may receive a driving current $I_{OLED}$ supplied by the pixel circuit 210 and emit light. The luminance of light emitted by the OELD may be varied according to the driving current $I_{OLED}$.

The pixel circuit 210 may include a capacitor C1, a driver transistor M1, and a second transistor M2.

When a scan control signal Sn is applied to a second transistor M2, a data signal Dm may be applied to a gate electrode of the driver transistor M1 and a first electrode of a storage capacitor C1 through the second transistor M2. During the application of the data signal Dm, a signal having a level corresponding to the data signal Dm may be stored in the storage capacitor C1. The driver transistor M1 may generate the driving current $I_{OLED}$ according to the magnitude of the data signal Dm and output the driving current $I_{OLED}$ to the anode of the OLED.

The OLED may receive the driving current $I_{OLED}$ from the pixel circuit 210 and emit light having a luminance corresponding to the data signal Dm.

As described above, the OLED display device may compensate for an initialization and a threshold voltage when the scan control signal Sn is applied. In this case, an undesired light emission operation may degrade a contrast ratio. In particular, initializing a large-sized panel for a short amount of time may be difficult. Also, due to the characteristics of a transistor, as a drain-source voltage Vds increases, a leakage current may be generated even in a turn-off state of the transistor.

Embodiments of the present invention provide a pixel circuit which may address the above-described problems.

Figure 3:
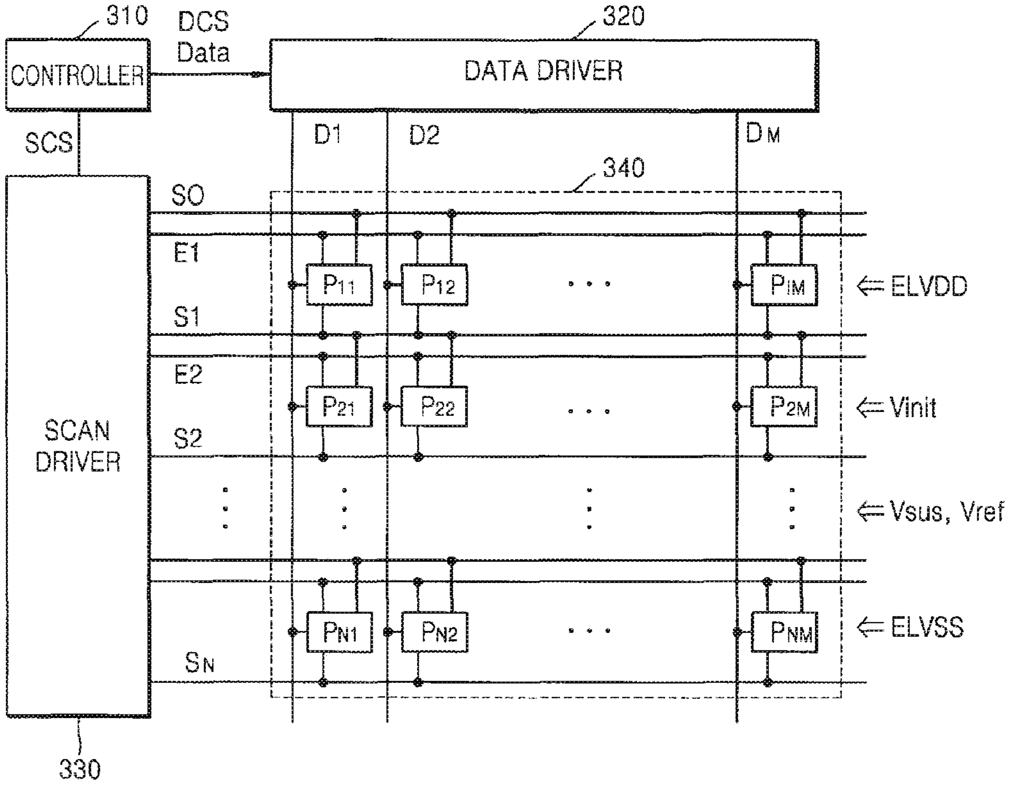
FIG. 3 is a diagram of a structure of an OLED display device according to an embodiment of the present invention.

FIG. 3 is a diagram of a structure of an OLED display device according to an embodiment of the present invention. The OLED display device includes a controller 310, a data driver 320, a scan driver 330, and a plurality of pixels 340.

The controller 310 may generate red, green, and blue (RGB) data and a data driver control signal DCS, and output the RGB data and the data driver control signal to the data driver 320. Also, the controller 310 may generate a scan driver control signal SCS and output the scan driver control signal SCS to the scan driver 330.

The data driver 320 may generate data signals Dm from the RGB data and output the data signals Dm to the plurality of pixels 340. The data driver 320 may generate the data signals Dm in response to the RGB data using a gamma filter and a digital-to-analog converter (DAC) circuit. The data signals Dm may be output to each of the plurality of pixels 340 located on the same row during a single scan period. Also, a plurality of data lines for transmitting the data signals Dm may be respectively coupled to the plurality of pixels 340 located on the same column.

The scan driver 330 may generate scan control signals Sn and emission control signals En in response to the scan driver control signals SCS and output the scan control signals Sn and the emission control signals En to the plurality of pixels 340. Scan control signal lines for transmitting the scan control signals Sn and emission control signal lines for transmitting the emission control signals En may be respectively coupled to the plurality of pixels 340 located on the same row. The scan control signals Sn and the emission control signals En may be sequentially driven in row units. (e.g., row by row)

The scan driver 330 according to an embodiment of the present invention may further output first scan control signals Sn−1 to initialize a voltage of the gate electrode of a driver transistor. Each of the first scan control signals Sn−1 may be commonly output to the plurality of pixels 340 located on the same row and may be sequentially driven in row units (e.g., row by row). The first scan control signals Sn−1 may be driven before the corresponding second scan control signal Sn is driven. According to an embodiment of the present invention, as shown in FIG. 3, the first scan control signals Sn−1 may be previous-row scan control signals Sn−1. To do this, the scan driver 330 may output an additional scan control signal S0 as an initialization control signals for a first row before a scan control signals S1 for the first row is driven.

The scan driver 330 according to an embodiment of the present invention may further output second emission control signals En+1 for reducing or minimizing a current variation due to a leakage current and for improving (e.g., reducing) crosstalk. The second emission control signals En+1 may be commonly output to the plurality of pixels 340 located on the same row and sequentially driven (e.g., provided) in row units (e.g., row by row). Each of the second emission control signals En+1 may be driven (e.g., provided) after the corresponding first emission control signal En is driven (e.g., provided). According to an embodiment of the present invention, as shown in FIG. 3, the second emission control signals En+1 may be next-row emission control signals En+1. To do this, the scan driver 330 may output an emission control signal E2 for improving crosstalk after the emission control signal E1 for the first row is driven.

As shown in FIG. 3, the plurality of pixels 340 may be arranged in a matrix format N×M. Each Pnm of the plurality of pixels 340 may include an OLED and a pixel circuit configured to drive the OLED. An anode power supply voltage of an anode power supply voltage source ELVDD, an initialization voltage of an initialization voltage source Vinit, a reference voltage of a reference voltage source Vref, a first power supply voltage of a first power supply voltage source Vsus, and a cathode power supply voltage of a cathode power supply voltage source ELVSS may be applied to each of the plurality of pixels 340.

Figure 4:
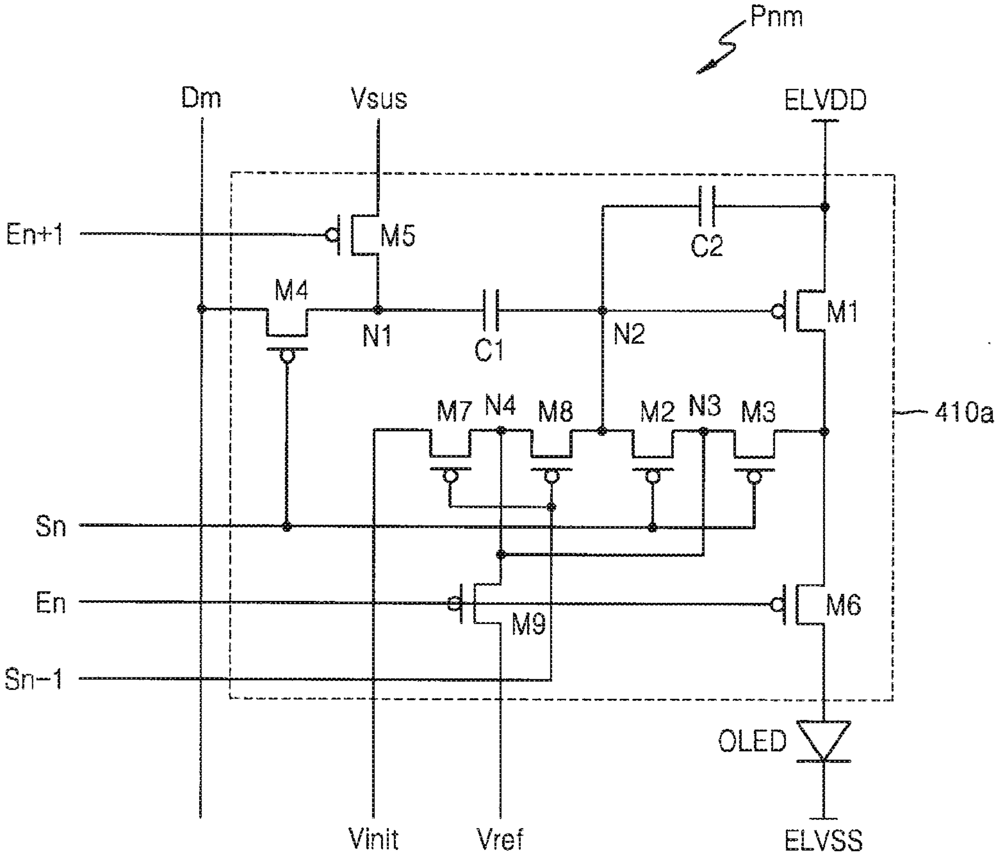
FIG. 4 is a diagram of a pixel circuit according to an embodiment of the present invention.

FIG. 4 is a diagram of a pixel circuit 410*a* according to an embodiment of the present invention.

A pixel Pnm located at an n-th row and an m-th column may include the pixel circuit 410*a* and an OLED. The pixel circuit 410*a* may receive a data signal Dm from the data driver 320 through a data line and output a driving current $I_{OLED}$ corresponding to the data signal Dm to the OLED. The OLED may emit light having a luminance corresponding to the driving current $I_{OLED}$.

The pixel circuit 410*a* of FIG. 4 may include a driver transistor M1, second through ninth transistors M2, M3, M4, M5, M6, M7, M8, and M9, and first and second capacitors C1 and C2.

The second transistor M2 may include a first electrode coupled to a second node N2, a second electrode coupled to a third node N3, and a gate electrode coupled to a scan line to receive a second scan control signal Sn. The description of the first, second, third nodes N1, N2, and N3 may be altered. For example, the designations and reference characters for the first node and third node N1 and N3 may be interchanged, such that the node N3 is referred to as the first node in the claims.

The third transistor M3 may include a first electrode coupled to the third node N3, a second electrode coupled to a second electrode of the driver transistor M1, and a gate electrode coupled to a scan line for the second scan control signal Sn.

The second and third transistors M2 and M3 may be coupled in series between a gate electrode and the second electrode of the driver transistor M1. The gate electrode and the second electrode of the driver transistor M1 may be coupled to each other by the second and third transistors M2 and M3. The second and third transistors M2 and M3 may couple the gate electrode and the second electrode of the driver transistor M1 in response to the second scan control signal Sn so that the driver transistor M1 can be diode-connected. Here, the diode-connection may refer to allowing a transistor to operate as a diode by coupling a gate electrode and a first electrode of the transistor or coupling the gate electrode and a second electrode of the transistor.

The fourth transistor M4 may include a first electrode coupled to a data line for providing a data signal Dm, a second electrode coupled to the first node N1, and a gate electrode coupled to a scan line for providing the signal Sn. The fourth transistor M4 may electrically couple the data signal line for providing the data signal Dm and the first node N1 in response to the second scan control signal Sn.

The fifth transistor M5 may include a first electrode coupled to a first power supply voltage source Vsus, a second electrode coupled to the first node N1, and a gate electrode coupled to an emission control line for providing a second emission control signal En+1. The fifth transistor M5 may electrically couple the first power supply voltage source Vsus and the first node N1 in response to the second emission control signal En+1.

The sixth transistor M6 may include a first electrode coupled to the second electrode of the driver transistor M1, a second electrode coupled to the anode of the OLED, and a gate electrode coupled to the emission line for providing the first emission control signal En. The sixth transistor M6 may be turned on when the first emission control signal En is transmitted, and turned off when the first control signal En is not transmitted.

The seventh transistor M7 may include a first electrode coupled to an initialization voltage source Vinit, a second electrode coupled to a fourth node N4, and a gate electrode coupled to a scan line for providing a first scan control signal Sn"1. The seventh transistor M7 may electrically couple the initialization voltage source Vinit and the fourth node N4 in response to the first scan control signal Sn−1.

The eighth transistor M8 may include a first electrode coupled to the fourth node N4, a second electrode coupled to the second node N2, and a gate electrode coupled to the scan line for providing the first scan control signal Sn−1. The eighth transistor M8 may electrically couple the fourth node N4 and the second node N2 in response to the first scan control signal Sn−1.

The ninth transistor M9 may include a first electrode coupled to the third and fourth nodes N3 and N4, a second electrode coupled to a reference voltage source Vref, and a gate electrode coupled to the first emission control line for providing the emission control signal En. The ninth transistor M9 may apply a voltage of the reference voltage source Vref to the third and fourth nodes N3 and N4 in response to the first emission control signal En.

According to embodiments of the present invention, since a leakage current is generated even in a turn-off state of a transistor with a rise in a drain-source voltage Vds due to the characteristics of the transistor, the ninth transistor M9 may be provided to reduce or minimize a voltage difference between a drain and a source of the transistor. Accordingly, the ninth transistor M9 may solve the problem of the leakage current generated in the turn-off states of the second, third, seventh, and eighth transistors M2, M3, M7, and M8.

A first capacitor C1 may include a first electrode coupled to the first node N1 and a second electrode coupled to the second node N2.

A second capacitor C2 may include a first electrode coupled to the second node N2 and a second electrode coupled to an anode power supply voltage source ELVDD.

Figure 5:
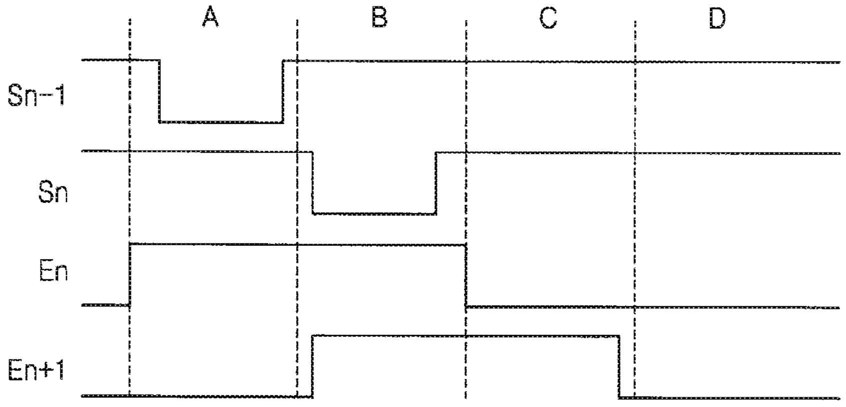
FIG. 5 is a timing diagram of driving signals according to an embodiment of the present invention.

FIG. 5 is a timing diagram of driving signals according to an embodiment of the present invention.

Before a first time period A, a driving current $I_{OLED}$ corresponding to a data signal Dm output by a previous frame may flow through an OLED so that the OLED can emit light. Also, each of third and fourth nodes N3 and N4 may remain at a voltage of the reference voltage source Vref in response to a second emission control signal En+1. Thus, the problem of a leakage current generated during turn-off states of second, third, seventh, and eighth transistors M2, M3, M7, and M8 may be solved.

During the first time period A, each of the first scan control signal Sn−1 and the second emission control signal En+1 may be at a first signal level, and each of the second scan control signal Sn and the first emission control signal En may be at a second signal level. Here, the first signal level may be a level at which the second through ninth transistors M2 through M9 are turned on, and the second signal level may be a level at which the second through ninth transistors M2 through M9 are turned off.

During the first time period A, since each of the first scan control signal Sn−1 and the first emission control signal En may be at the first signal level, and each of the second scan control signal Sn and the first emission control signal En may be at the second signal level, the second, third, fourth, sixth, and ninth transistors M2, M3, M4, M6, and M9 may be turned off. The fifth transistor M5 may be turned on in response to the second emission control signal En+1 so that the first node N1 may be initialized to a voltage level of a first power supply voltage source Vsus. Also, the seventh transistor M7 and the eighth transistor M8 may be turned on in response to the first scan control signal Sn−1 so that the second node N2 may be initialized to an initialization voltage of a initialization voltage source Vinit. A voltage corresponding to a voltage difference between the initialized first and second nodes N1 and N2 may be stored in the first capacitor C1. Also, a voltage corresponding to a voltage difference between an anode power supply voltage of the anode power supply voltage source ELVDD and the initialized second node N2 may be stored in the second capacitor C2.

During the first time period A, an initialization signal may be separated into the first scan control signal Sn−1 and the second emission control signal En+1 and driven. Thus, by adding the initialization voltage of the initialization voltage source Vinit, the difficulty of initialization in large-sized panels may be overcome.

Next, during a second time period B, the second scan control signal Sn may be at the first signal level, and each of the first scan control signal Sn−1, the first emission control signal En, and the second emission control signal En+1 may be at the second signal level. During the second time period B, since the second scan control signal Sn may be at the first signal level, and each of the first scan control signal Sn−1, the first emission control signal En, and the second emission control signal En+1 at the second signal level the fifth, sixth, seventh, eighth, and ninth transistors M5, M6, M7, M8, and M9 may be turned off. Each of the second transistor M2 and the third transistor M3 may be turned on in response to the second scan control signal Sn so that the driver transistor M1 can be diode-connected, and an anode power supply voltage of an anode power supply voltage source ELVDD—threshold voltage Vth can be applied to the second node N2. The fourth transistor M4 may be turned on in response to the second scan control signal Sn so that a data voltage Vdata corresponding to the data signal Dm can be applied to the first node N1. Thus, a voltage corresponding to a voltage difference between the first and second nodes N1 and N2 may be stored in the first capacitor C1, and a voltage corresponding to a voltage difference between the anode power supply voltage of the anode power supply voltage source ELVDD and the voltage of the second node N2 may be stored in the second capacitor C2. Thus, the threshold voltage Vth may be compensated for, and the data signal Dm may be stored.

Next, during a third time period C, the first emission control signal En may be at the first signal level, and each of the second emission control signal En+1, the first scan control signal Sn−1, and the second scan control signal Sn may be at the second signal level. During the third time period C, since the first emission control signal En may may be at the first signal level, and each of the second emission control signal En+1, the first scan control signal Sn−1, and the second scan control signal Sn are at the second signal level, the second, third, fourth, fifth, seventh, and eighth transistors M2, M3, M4, M5, M7, and M8 may be turned off. The sixth and ninth transistors M6 and M9 may be turned on in response to the first emission control signal En. The ninth transistor M9 may be turned on in response to the first emission control signal En so that the reference voltage of the reference voltage source Vref can be applied to the third and fourth nodes N3 and N4. Thus, the problem of a leakage current generated during the turn-off states of the second, third, seventh, and eighth transistors M2, M3, M7, and M8 may be solved. During the third time period C, although the sixth transistor M6 is turned on, the first and second nodes N1 and N2 may be floated. Thus, the driver transistor M1 cannot operate, so the OLED may not emit light.

Next, during a fourth time period D, each of the first and second emission control signals En and En+1 may be at the first signal level, and each of the first and second scan control signals Sn−1 and Sn may be at the second signal level. During the fourth time period D, since the first and second emission control signals En and En+1 may be at the first signal level, and the first and second scan control signals Sn−1 and Sn may be at the second signal level, the second, third, fourth, seventh, and eighth transistors M2, M3, M4, M7, and M8 may be turned on. The fifth transistor M5 may be turned off in response to the second emission control signal En+1 so that a voltage of the first node N1 may drop to the first power supply voltage of the first power supply voltage source Vsus. Since the second node N2 is floated, when the voltage of the first node N1 drops, a voltage of the second node N2 also may drop. In this case, the second capacitor C2 may be charged with a voltage (e.g., a predetermined voltage) corresponding to the voltage applied to the second node N2. Here, since the range in which the voltage of the second node N2 drops is determined by a data voltage Vdata corresponding to the data signal Dm, the voltage charged in the second capacitor C2 may be controlled by the data voltage Vdata. The sixth transistor M6 may be turned on in response to the first emission control signal En. Thus, the driver transistor M1 may supply a driving current $I_{OLED}$ corresponding to the voltage applied to the second node N2 to the OLED, so the OLED may emit light (e.g., with a predetermined luminance). The ninth transistor M9 may be turned on in response to the first emission control signal En so that the reference voltage of the reference voltage source Vref may be applied to the third and fourth nodes N3 and N4. Thus, a leakage current generated during the turn-off states of second, third, seventh, and eighth transistors M2, M3, M7, and M8 may be solved. Also, since the first node N1 remains at the voltage level of the first power supply voltage source Vsus during the fourth time period D, a variation in leakage current according to the data voltage Vdata, which is caused by the third transistor M3, may be minimized to improve a crosstalk.

Accordingly, the driving current $I_{OLED}$ output by the pixel circuit 410*a* according to one embodiment of the present invention may be determined irrespective of the voltage of the anode of the OLED, the cathode power supply voltage of the cathode power supply voltage source ELVSS, and the threshold voltage Vth of the driver transistor M1. Thus, the embodiments of the present invention may solve a problem of an increase in the voltage of the data signal Dm or degradation of image quality, which is caused by a variation in the driving current $I_{OLED}$ due to the voltage of the anode of the OLED. Also, the embodiments of the present invention may solve the degradation of image quality due to a variation in the voltage of the cathode power supply voltage source ELVSS.

Figure 6:
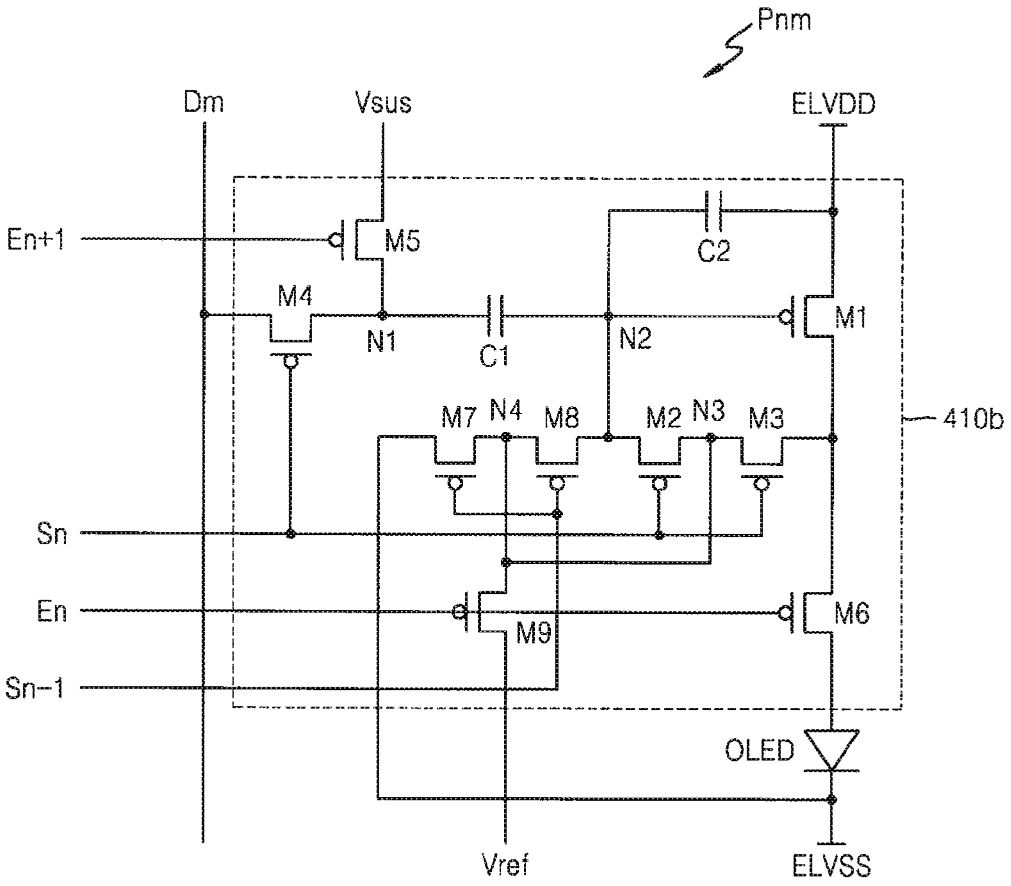
FIG. 6 is a diagram of a structure of a pixel circuit according to another embodiment of the present invention.

FIG. 6 is a diagram of a pixel circuit 410*b* according to another embodiment of the present invention.

The pixel circuit 410*b* of FIG. 6 may differ from the pixel circuit 410*a* of FIG. 4 in that an the first electrode of the seventh transistor M7 is coupled to a cathode power supply voltage source ELVSS of an OLED without additionally providing an initialization voltage source Vinit. Referring to FIGS. 5 and 6, during the first time period A, the fifth transistor M5 may be turned on in response to the second emission control signal En+1 so that the first node N1 can be initialized to the first power supply voltage of the first power supply voltage source Vsus. Also, the seventh transistor M7 and the eighth transistor M8 may be turned on in response to the first scan control signal Sn−1 so that the second node N2 can be initialized to the cathode power supply voltage of the cathode power supply voltage source ELVSS. A voltage corresponding to a voltage difference between the first and second nodes N1 and N2 may be stored in the first capacitor C1. Also, a voltage corresponding to a voltage difference between the anode power supply voltage of the anode power supply voltage source ELVDD and the initialized second node N2 may be stored in the second capacitor C2. The remaining operations are substantially the same as described with reference to FIGS. 4 and 5, and thus a description thereof will be omitted.

Figure 7:
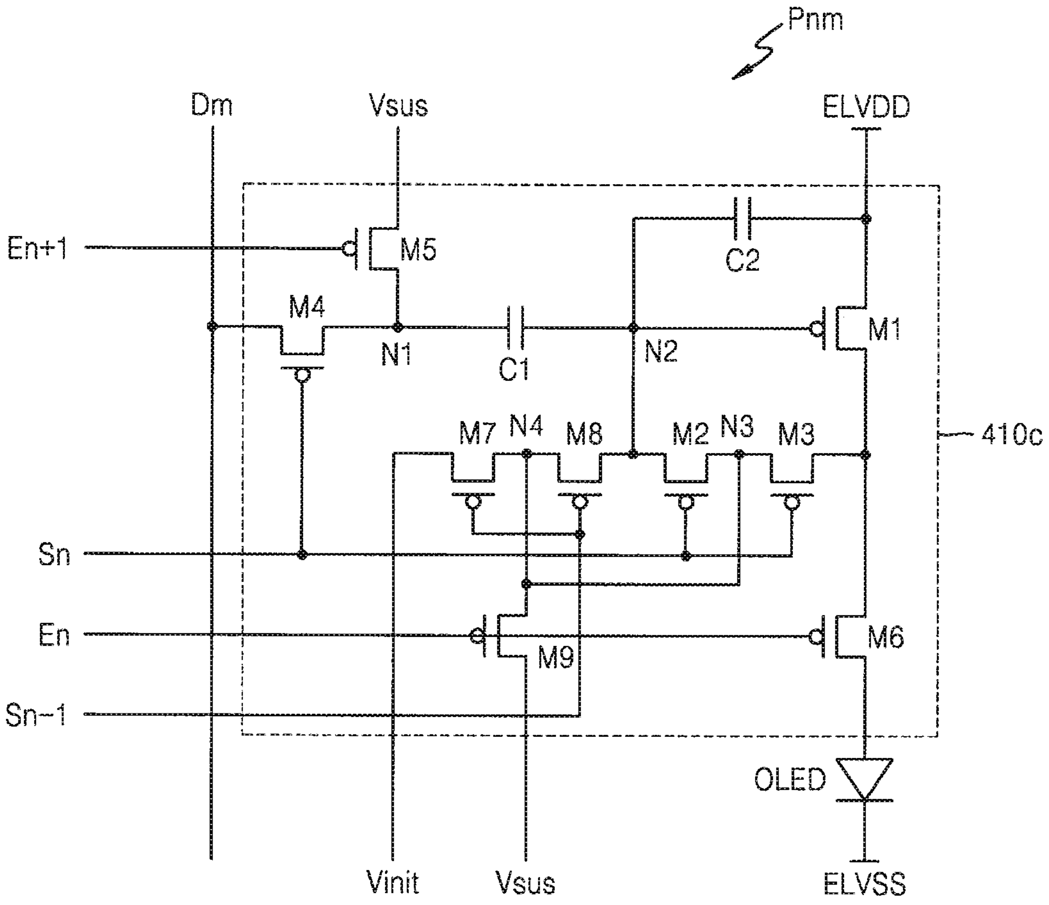
FIG. 7 is a diagram of a structure of a pixel circuit according to another embodiment of the present invention.

FIG. 7 is a diagram of a pixel circuit 410*c* according to another embodiment of the present invention.

The pixel circuit 410*c* of FIG. 7 may differ from the pixel circuit 410*a* of FIG. 4 in that the reference voltage source Vref coupled to the ninth transistor M9 replaced by the first power supply voltage source Vsus. Referring to FIGS. 5 and 7, during the third and fourth time periods C and D, the ninth transistor M9 may be turned on in response to the first emission control signal En so that the first power supply voltage of the first power supply voltage source Vsus can be applied to the third and fourth nodes N3 and N4. Also, a problem of a leakage current generated during the turn-off states of the second, third, seventh, and eighth transistors M2, M3, M7, and M8 may be solved. The remaining operations are substantially the same as described with reference to FIGS. 4 and 5, and thus a description thereof will be omitted.

Figure 8:
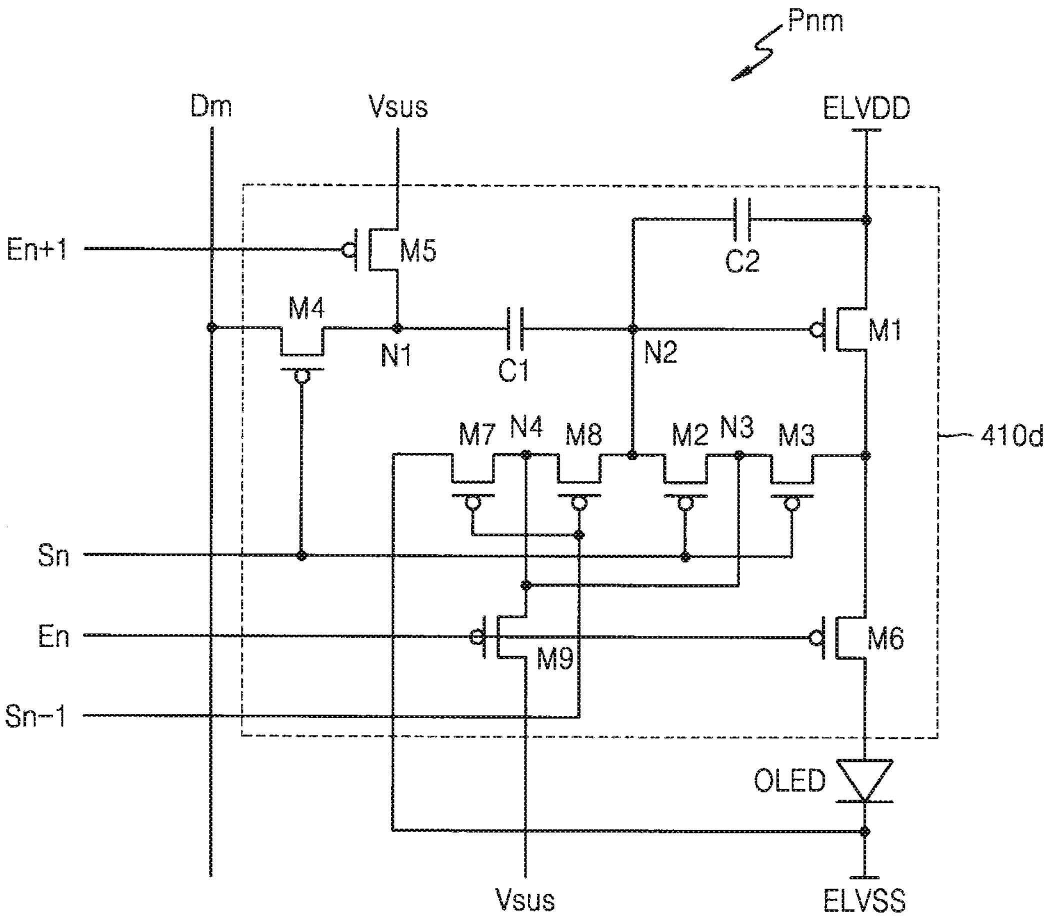
FIG. 8 is a diagram of a structure of a pixel circuit according to another embodiment of the present invention.

FIG. 8 is a diagram of a pixel circuit 410*d* according to another embodiment of the present invention.

The pixel circuit 410*d* of FIG. 8 may differ from the pixel circuit 410*a* of FIG. 4 in the first electrode of the seventh transistor M7 is coupled to a cathode power supply voltage source ELVSS of an OLED without additionally providing an initialization voltage source Vinit, and the reference voltage source Vref is replaced with the first power supply voltage source Vsus. During the first time period A, the seventh transistor M7 and the eighth transistor M8 may be turned on in response to the first scan control signal Sn−1 so that the second node N2 can be initialized to the cathode power supply voltage of the cathode power supply voltage source ELVSS. Also, during the third time period C and the fourth time period D, the ninth transistor M9 may be turned on in response to the first emission control signal En so that the first power supply voltage of the first power supply voltage source Vsus can be applied to the third and fourth nodes N3 and N4. Also, a problem of a leakage current generated during the turn-off states of the second, third, seventh, and eighth transistors M2, M3, M7, and M8 may be solved. The remaining operations are substantially the same as described with reference to FIGS. 4 and 5, and thus a description thereof will be omitted.

Figure 9:
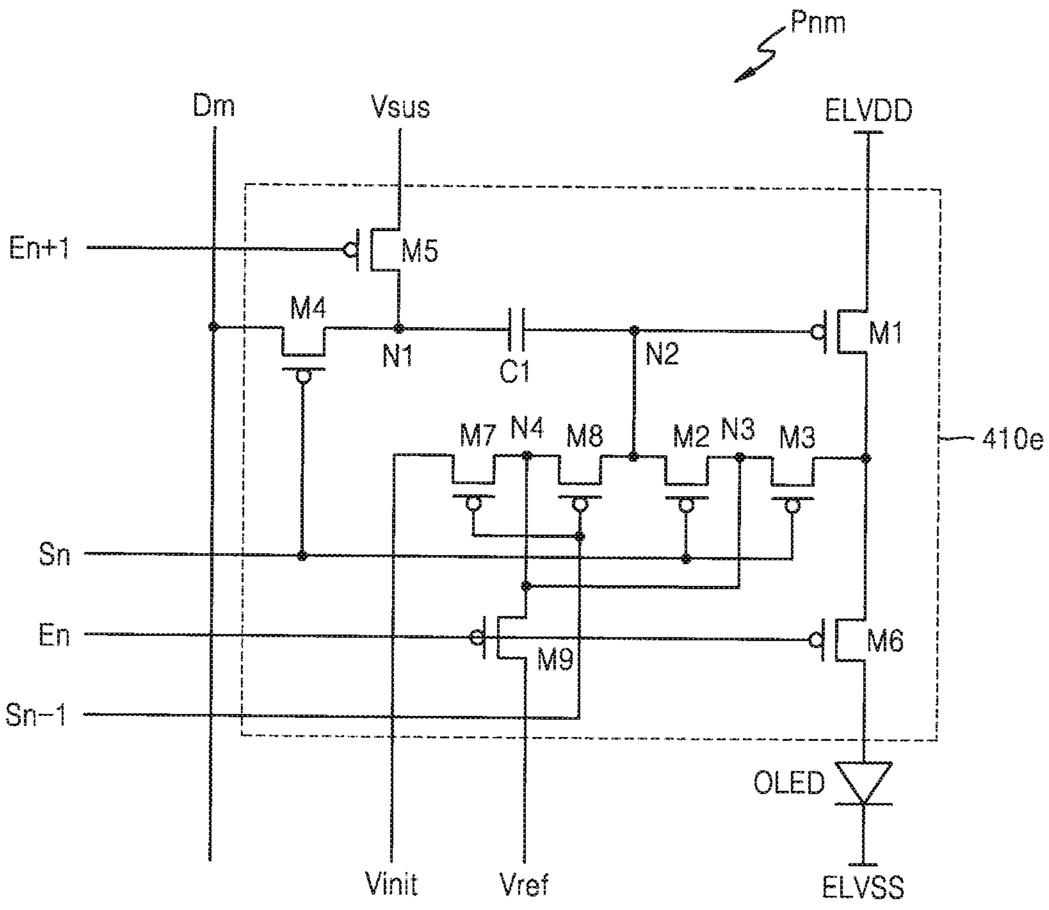
FIG. 9 is a diagram of a structure of a pixel circuit according to another embodiment of the present invention.

FIG. 9 is a diagram of a pixel circuit 410*e* according to another embodiment of the present invention.

The pixel circuit 410*e* of FIG. 9 may include a driver transistor M1 and second through ninth transistors M2, M3, M4, M5, M6, M7, M8, and M9 and a first capacitor C1. The pixel circuit 410*e* of FIG. 9 may differ from the pixel circuit 410*a* of FIG. 4 in that the second capacitor C2 is omitted.

The pixel circuit 410*e* of FIG. 9 will now be described with reference to the timing diagram of the driving signals shown in FIG. 5. Before the first time period A, a driving current $I_{OLED}$ corresponding to a data signal Dm of a previous frame may flow through the OLED so that the OLED may emit light. Also, the third and fourth nodes N3 and N4 may remain at the reference voltage of the reference voltage source Vref in response to the second emission control signal En+1.

During the first time period A, each of the first scan control signal Sn−1 and the second emission control signal En+1 are at a first signal level, and each of a second scan control signal Sn and a first emission control signal En are at a second signal level. During the first time period A, the fifth transistor M5 may be turned on in response to the second emission control signal En+1 so that the first node can be initialized to a first power supply voltage of the first power supply voltage source Vsus. Also, the seventh transistor M7 and the eighth transistor M8 may be turned on in response to the first scan control signal Sn−1 so that the second node N2 can be initialized to the initialization voltage of the initialization voltage source Vinit. A voltage corresponding to a voltage difference between the first and second nodes N1 and N2 may be stored in the first capacitor Next, during the second time period B, the second scan control signal Sn may be at the first signal level, and each of the first scan control signal Sn−1, the first emission control signal En, and the second emission control signal En+1 may be at the second signal level. During the second time period B, the second and third transistors M2 and M3 may be turned on in response to the second scan control signal Sn so that the driver transistor M1 can be diode-connected and an anode power supply voltage of the anode power supply voltage source ELVDD—threshold voltage Vth can be applied to the second node N2. The fourth transistor M4 may be turned on in response to the second scan control signal Sn so that a data voltage Vdata corresponding to the data signal Dm can be applied to the first node N1. Thus, a voltage corresponding to a voltage difference between the first and second nodes N1 and N2 may be stored in the first capacitor C1.

Next, during a third period C, the first emission control signal En is at the first signal level, and each of the second emission control signal En+1, the first scan control signal Sn−1, and the second scan control signal Sn is at the second signal level. During the third time period C, the sixth transistor M6 and the ninth transistor M9 may be turned on in response to the first emission control signal En. The ninth transistor M9 may be turned on in response to the first emission control signal En so that the reference voltage of the reference voltage source Vref can be applied to the third and fourth nodes N3 and N4. During the third time period C, although the sixth transistor M6 is turned on, the first and second nodes N1 and N2 may be floated. Thus, since the driver transistor M1 cannot operate, the OLED may not emit light.

Next, during a fourth time period D, each of the first emission control signal En and the second emission control signal En+1 may be at the first signal level, and each of the first scan control signal Sn−1 and the second scan control signal Sn may be at the second signal level. During the fourth time period D, the fifth transistor M5 may be turned on in response to the second emission control signal En+1 so that a voltage of the first node N1 can drop to that of the first power supply voltage source Vsus. Since the second node N2 is floated, when the voltage of the first node N1 is dropped, a voltage of the second node N2 may also be dropped. In this case, the second capacitor C2 may be charged with a voltage (e.g., a predetermined voltage) corresponding to the voltage applied to the second node N2.

Here, since the range in which the voltage of the second node N2 is dropped is determined by the data voltage Vdata corresponding to the data signal Dm, the voltage charged in the second capacitor C2 may be controlled by the data voltage Vdata. The sixth transistor M6 may be turned on in response to the first emission control signal En. Thus, the driver transistor M1 may supply a driving current $I_{OLED}$ corresponding to the voltage applied to the second node N2 to the OLED, so the OLED may emit light (e.g., light having a predetermined luminance.) The ninth transistor M9 may be turned on in response to the first emission control signal En so that the reference voltage of the reference voltage source Vref can be applied to the third and fourth nodes N3 and N4.

Figure 10:
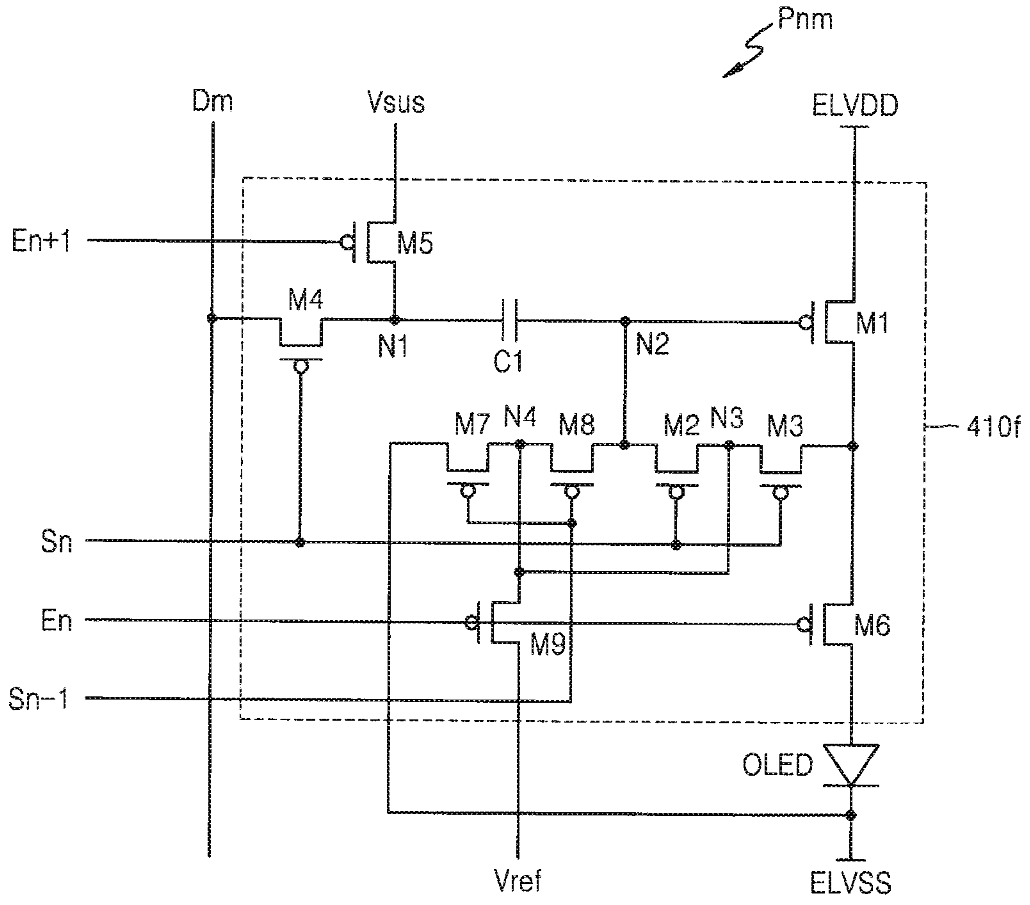
FIG. 10 is a diagram of a structure of a pixel circuit according to another embodiment of the present invention.

FIG. 10 is a diagram of a pixel circuit 410*f* according to another embodiment of the present invention.

The pixel circuit 410*f* of FIG. 10 may differ from the pixel circuit 410*e* of FIG. 9 in that the initialization voltage of the initialization voltage source Vinit may be coupled to the cathode power supply voltage source ELVSS of an OLED without additionally applying the initialization voltage of the initialization voltage source Vinit. Referring to FIG. 10, during the first time period A, the fifth transistor M5 may be turned on in response to the second emission control signal En+1 so that the first node N1 can be initialized to the voltage of the first power supply voltage source Vsus. Also, a seventh transistor M7 and an eighth transistor M8 may be turned on in response to the first scan control signal Sn−1 so that the second node N2 can be initialized to the cathode power supply voltage of the cathode power supply voltage source ELVSS. A voltage corresponding to the voltage difference between the initialized first and second nodes N1 and N2 may be stored in the first capacitor C1.

The remaining operations are substantially the same as described with reference to FIGS. 5 and 9, and thus a description thereof will be omitted.

Figure 11:
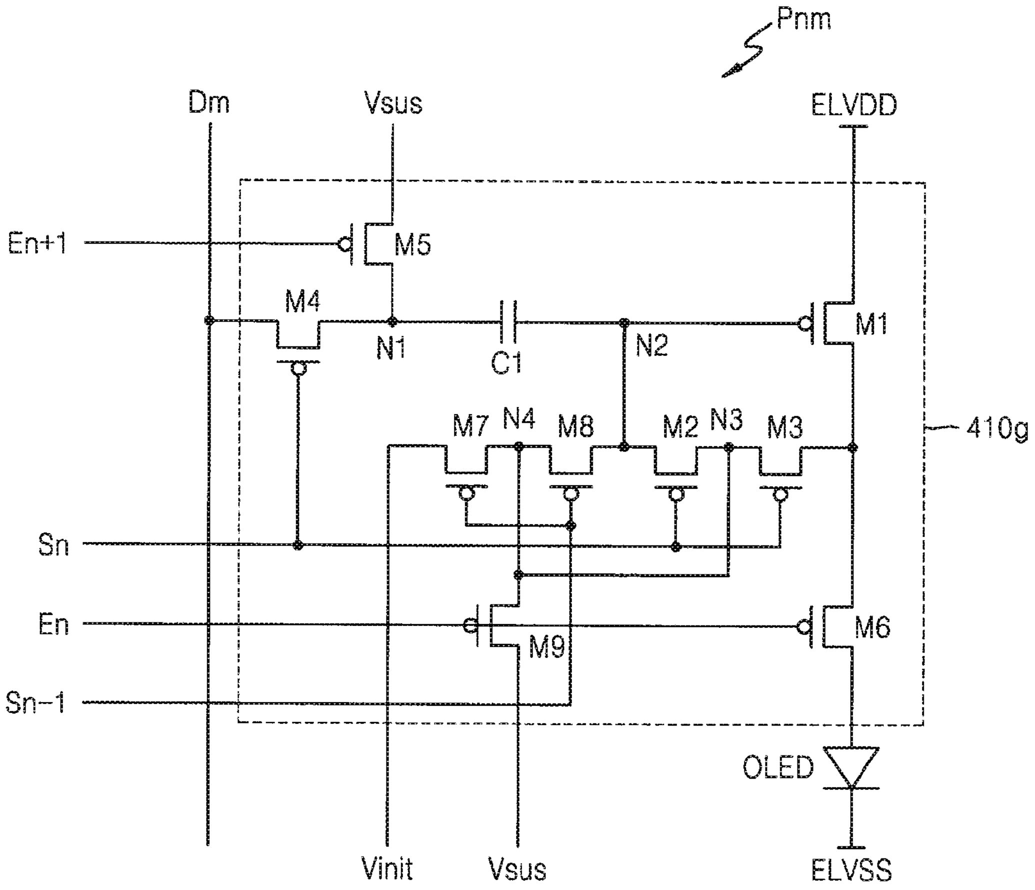
FIG. 11 is a diagram of a structure of a pixel circuit according to another embodiment of the present invention.

FIG. 11 is a diagram of a pixel circuit 410*g* according to another embodiment of the present invention.

The pixel circuit 410*g* of FIG. 11 may differ from the pixel circuit 410*e* of FIG. 9 in that the reference voltage source Vref coupled to the ninth transistor may be replaced with the first power supply voltage source Vsus. Referring to FIG. 11, the ninth transistor M9 may be turned on in response to the first emission control signal En during third and fourth time periods C and D so that the first power supply voltage of the first power supply voltage source Vsus can be applied to the third and fourth nodes N3 and N4. Thus, the problem of a leakage current caused during the turn-off state of second, third, seventh, and eighth transistors M2, M3, M7, and M8 may be solved. The remaining operations are substantially the same as described with reference to FIGS. 5 and 9, and thus a description thereof will be omitted.

Figure 12:
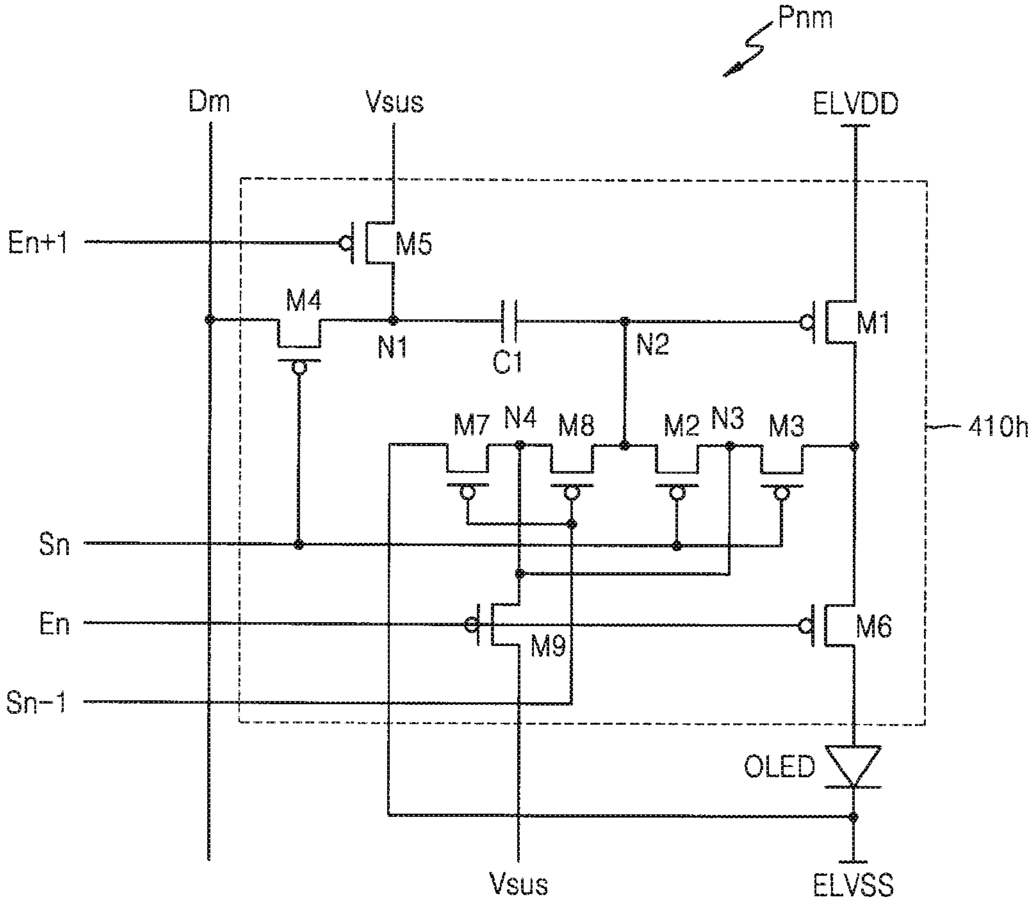
FIG. 12 is a diagram of a structure of a pixel circuit according to another embodiment of the present invention.

FIG. 12 is a diagram of a pixel circuit 410*h* according to another embodiment of the present invention.

The pixel circuit 410*h* of FIG. 12 may differ from the pixel circuit 410*e* of FIG. 9 in that the first electrode of the seventh transistor M7 is the may be coupled to a cathode power supply voltage source ELVSS of an OLED without additionally applying the initialization voltage of the initialization voltage source Vinit, and the reference voltage source Vref coupled to the ninth transistor M9 is replaced with the first power supply voltage source Vsus. During the first time period A, each of the seventh and eighth transistors M7 and M8 may be turned on in response to the first scan control signal Sn−1 so that the second node N2 may be initialized to the cathode power supply voltage of the cathode power supply voltage source ELVSS. Also, during the third time period C and the fourth time period D, the ninth transistor M9 may be turned on in response to the first emission control signal En so that the first power supply voltage of the first power supply voltage source Vsus can be applied to the third and fourth nodes N3 and N4, and the problem of a leakage current caused during turn-off states of the second, third, seventh, and eighth transistors M2, M3, M7, and M8 may be solved. The remaining operations are substantially the same as described with reference to FIGS. 5 and 9, and thus a description thereof will be omitted.

According to embodiments of the present invention as described above, a threshold voltage of a driver transistor and a voltage drop may be compensated for, and an initialization time may be separately driven to improve a contrast ratio. Also, a leakage current caused by a data voltage can be suppressed using a fixed power source so that a current variation caused by the leakage current can be reduced or minimized to improve crosstalk, and the duty of an emission control signal can be adjusted to remove motion blur.

While exemplary embodiments have been described herein, it will be understood by those skilled in the art that various changes in form and details may be made without departing from the spirit and scope of the invention as defined by the appended claims. Therefore, the scope of the invention is defined not by the detailed description of the invention but by the appended claims, and all differences within the scope will be construed as being included in the present invention and their equivalents.

What is claimed is:

1. A pixel circuit for driving a light emitting device comprising a first electrode and a second electrode, the pixel circuit comprising:
   - a driver transistor comprising a first electrode, a second electrode, and a gate electrode, the driver transistor for supplying a driving current according to a voltage applied to the gate electrode of the driver transistor;
   - a second transistor for receiving a second scan control signal, the second transistor comprising a first electrode coupled to the gate electrode of the driver transistor and a second electrode coupled to a first node;
   - a third transistor for receiving the second scan control signal, the third transistor comprising a first electrode coupled to the first node and a second electrode coupled to the second electrode of the driver transistor;
   - a fourth transistor comprising a second electrode, wherein a data signal is transferred to the second electrode in response to the second scan control signal;
   - a fifth transistor for transmitting a first power supply voltage to the second electrode of the fourth transistor in response to a second emission control signal;
   - a sixth transistor coupled in series between the second electrode of the driver transistor and the first electrode of the light emitting device, the sixth transistor for outputting the driving current received from the driver transistor to the first electrode of the light emitting device in response to a first emission control signal applied to a gate electrode of the sixth transistor;
   - a seventh transistor for transmitting an initialization voltage to a second electrode of the seventh transistor in response to a first scan control signal;
   - an eighth transistor coupled between the second electrode of the seventh transistor and the gate electrode of the driver transistor for transmitting the initialization voltage to the gate electrode of the driver transistor in response to the first scan control signal;
   - a ninth transistor for transmitting a reference voltage to the second electrode of the second transistor, to the first electrode of the third transistor, to the second electrode of the seventh transistor, and to a first electrode of the eighth transistor; and
   - a first capacitor comprising a first electrode coupled to the second electrode of the fourth transistor and a second electrode of the fifth transistor, and a second electrode coupled to the gate electrode of the driver transistor.

2. The pixel circuit of claim 1, wherein the light emitting device is an organic light emitting diode (OLED).

3. The pixel circuit of claim 1, wherein the second transistor and the third transistor couple the gate electrode of the driver transistor to the second electrode of the driver transistor in response to the second scan control signal.

4. The pixel circuit of claim 1, wherein the second electrode of the light emitting device is coupled to a third power supply.

5. The pixel circuit of claim 1, wherein the initialization voltage is a third power supply voltage.

6. The pixel circuit of claim 1, wherein the reference voltage is the first power supply voltage.

7. The pixel circuit of claim 1, further comprising a second capacitor comprising a first electrode coupled to the second electrode of the first capacitor and a second electrode coupled to a second power supply voltage source.

8. The pixel circuit of claim 1, wherein the first electrode of the driver transistor is a source electrode, and the second electrode of the driver transistor is a drain electrode.

9. The pixel circuit of claim 1, wherein the first and second scan control signals and the first and second emission control signals are driven during:

a first time period in which the first scan control signal and the second emission control signal are at a first signal level, and the second scan control signal and the first emission control signal are at a second signal level;

a second time period in which the data signal is ready for programming the pixel circuit, the first scan control signal, the first emission control signal, and the second emission control signal are at the second signal level, and the second scan control signal is at the first signal level;

a third time period in which the first and second scan control signals and the second emission control signal are at the second signal level, and the first emission control signal is at the first signal level; and a fourth time period in which the first and second scan control signals are at the second signal level and the first and second emission control signals are at the first signal level, wherein the first signal level is a level at which the driver transistor and the second through ninth transistors are turned on, and the second signal level is a level at which the driver transistor and the second through ninth transistors are turned off.

10. An organic light emitting diode (OLED) display device comprising:

a plurality of pixels;

a scan driver configured to output first and second scan control signals and first and second emission control signals to each of the plurality of pixels; and a data driver configured to generate data signals and output a data signal of the data signals to each pixel of the plurality of pixels, wherein each of the plurality of pixels comprises:

an OLED comprising first and second electrodes;

a driver transistor comprising a first electrode, a second electrode, and a gate electrode, the driver transistor for outputting a driving current in response to a voltage applied to the gate electrode of the driver transistor;

a second transistor for receiving a second scan control signal of the second scan control signals, the second transistor comprising a first electrode coupled to the gate electrode of the driver transistor and a second electrode coupled to a first node;

a third transistor for receiving the second scan control signal, the third transistor comprising a first electrode coupled to the first node and a second electrode coupled to the second electrode of the driver transistor;

a fourth transistor comprising a second electrode, wherein the data signal of the data signals is transferred to the second electrode in response to the second scan control signal;

a fifth transistor for transmitting a first power supply voltage to the second electrode of the fourth transistor in response to the second emission control signal;

a sixth transistor coupled in series between the second electrode of the driver transistor and the first electrode of the light emitting device, the sixth transistor for outputting the driving current received from the driver transistor to the first electrode of the light emitting device in response to the first emission control signal applied to a gate electrode of the sixth transistor;

a seventh transistor for transmitting an initialization voltage to a second electrode of the seventh transistor in response to a first scan control signal of the first scan control signals;

an eighth transistor coupled between the second electrode of the seventh transistor and the gate electrode of the driver transistor for transmitting the initialization voltage to the gate electrode of the driver transistor in response to the first scan control signal;

a ninth transistor for transmitting a reference voltage to the second electrode of the second transistor, the first electrode of the third transistor, the second electrode of the seventh transistor, and a first electrode of the eighth transistor in response to the first emission control signal; and a first capacitor comprising a first electrode coupled to the second electrode of the fourth transistor and the second electrode of the fifth transistor, and a second electrode coupled to the gate electrode of the driver transistor.

11. The OLED display device of claim 10, wherein the second transistor and the third transistor couple the gate electrode of the driver transistor to the second electrode of the driver transistor in response to the second scan control signal.

12. The OLED display device of claim 10, wherein the second electrode of the light emitting device is coupled to a third power supply.

13. The OLED display device of claim 10, wherein the initialization voltage is a third power supply voltage.

14. The OLED display device of claim 10, wherein the reference voltage is the first power supply voltage.

15. The OLED display device of claim 10, further comprising a second capacitor comprising a first electrode coupled to the second electrode of the first capacitor and a second electrode coupled to a second power supply voltage source.

16. The OLED display device of claim 10, wherein the first electrode of the driver transistor is a source electrode, and the second electrode of the driver transistor is a drain electrode.

17. The OLED display device of claim 10, wherein the scan driver is driven during:

a first time period in which the first scan control signal and the second emission control signal are at a first signal level, and the second scan control signal and the first emission control signal are at a second signal level;

a second time period in which the data signals are ready for programming the plurality of pixels, the first scan control signal, the first emission control signal, and the second emission control signal are at the second signal level, and the second scan control signal is at the first signal level;

a third time period in which the first and second scan control signals and the second emission control signal are at the second signal level, and the first emission control signal is at the first signal level; and a fourth time period in which the first and second scan control signals are at the second signal level and the first and second emission control signals are at the first signal level, wherein the first signal level is a level at which the driver transistor and the second through ninth transistors are turned on, and the second signal level is a level at which the driver transistor and the second through ninth transistors are turned off.

* * * * *